(12) United States Patent
Lorenz et al.

(10) Patent No.: US 12,083,760 B2
(45) Date of Patent: Sep. 10, 2024

(54) CURING MOLD ASSEMBLIES FOR NON-PNEUMATIC TIRES AS WELL AS METHODS OF MANUFACTURE

(71) Applicant: Bridgestone Americas Tire Operations, LLC, Nashville, TN (US)

(72) Inventors: Zachary G. Lorenz, Nashville, TN (US); Steven J. Jenkins, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/559,993

(22) PCT Filed: Jun. 17, 2022

(86) PCT No.: PCT/US2022/073000
§ 371 (c)(1),
(2) Date: Nov. 9, 2023

(87) PCT Pub. No.: WO2022/266664
PCT Pub. Date: Dec. 22, 2022

(65) Prior Publication Data
US 2024/0246305 A1 Jul. 25, 2024

Related U.S. Application Data

(60) Provisional application No. 63/212,201, filed on Jun. 18, 2021.

(51) Int. Cl.
*B29D 30/02* (2006.01)
*B60C 7/10* (2006.01)

(52) U.S. Cl.
CPC ............. *B29D 30/02* (2013.01); *B60C 7/107* (2021.08)

(58) Field of Classification Search
CPC .............................. B29D 30/02; B60C 7/107
See application file for complete search history.

(56) References Cited

U.S. PATENT DOCUMENTS

2009/0107596 A1    4/2009   Palinkas et al.
2014/0070448 A1    3/2014   Martin et al.
(Continued)

FOREIGN PATENT DOCUMENTS

JP    2021030542 A    3/2021

OTHER PUBLICATIONS

International Search Report and Written Opinion dated Oct. 12, 2022 issued by KIPO in connection with corresponding International Application No. PCT/US2022/073000.

*Primary Examiner* — John J DeRusso
(74) *Attorney, Agent, or Firm* — Shaun J. Fox; Matthew P. Dugan

(57) ABSTRACT

Mold assemblies for curing non-pneumatic tires include first and second mold sections that are axially displaceable relative to one another. Lateral-pressure members are supported on the first mold section. The first lateral pressure members include a first pressure member wall with first and second edge surface portions. A first curing shoe cooperatively engages the first edge surface portion of the first lateral-pressure member and an associated less-than-fully-cured non-pneumatic tire. A second curing shoe abuttingly engages the second edge surface portion of the first lateral-pressure member and the associated less-than-fully-cured nonpneumatic tire. Methods of manufacturing non-pneumatic tires are also included.

20 Claims, 12 Drawing Sheets

(56) References Cited

U.S. PATENT DOCUMENTS

| | | |
|---|---|---|
| 2015/0034225 A1 | 2/2015 | Martin |
| 2019/0283500 A1 | 9/2019 | Wilson et al. |
| 2022/0168980 A1* | 6/2022 | Celik .................. B60C 7/143 |

* cited by examiner

CURING MOLD ASSEMBLIES FOR NON-PNEUMATIC TIRES AS WELL AS METHODS OF MANUFACTURE

This application is the National Stage of International Application No. PCT/US2022/073000, filed on Jun. 17, 2022, which claims the benefit of priority from U.S. Provisional Patent Application No. 63/212,201, filed on Jun. 18, 2021, the entire contents of which is hereby incorporated herein by reference.

BACKGROUND

The subject matter of the present disclosure broadly relates to the art of vehicle tire manufacturing and, more particularly, to mold assemblies for curing non-pneumatic tires as well as methods of manufacturing non-pneumatic tires using such mold assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Conventional pneumatic tires include a tire casing with a tread formed on or along the exterior thereof that is configured to engage a roadway or other ground surface. The tire casing includes an annular body formed from a plurality of layers or plies (e.g., radial plies, belt plies) with opposing sidewalls that extend radially inward from along shoulder portions of the annular body to beads forming the radially-inward extent of the sidewalls. The inner surface of the annular body and the opposing sidewalls are covered by an inner liner that defines the tire chamber of a pneumatic tire.

In conventional tire manufacturing processes, an uncured tire carcass and tread assembly is loaded into a mold assembly on a tire curing press. The mold assembly includes a plurality of die segments with an inside surface portion that includes a section of a tread pattern. The mold assembly is closed by the tire curing press, which positions the die segments in abutting engagement with the tread material of the uncured tire assembly. The tire curing press also includes a curing bladder that is positioned inside the mold assembly such that the uncured tire assembly is spaced outward of the curing bladder in an uninflated condition of the curing bladder. During the curing process, the curing bladder is inflated such that the curing bladder extends into the tire chamber of the uncured tire assembly in abutting engagement with the inner liner. While under pressure from the mold assembly and the inflated curing bladder, the tire curing press introduces heat to the uncured tire assembly which vulcanizes or otherwise crosslinks the uncured tire material to form a completed tire.

Notwithstanding the wide usage and overall success of known types and kinds of tire mold assemblies and methods of manufacture, it has been recognized that certain disadvantages exist with known processes that could limit the applicability and/or use thereof in connection with the manufacture of tire assemblies having other structural arrangements, such as so-called non-pneumatic tires, for example. Accordingly, it is believed desirable to develop mold assemblies and methods of manufacture that may aid in overcoming the foregoing and/or other problems and/or disadvantages of known techniques, and/or otherwise advance the manufacture of non-pneumatic tires.

BRIEF DESCRIPTION

One example of a method of manufacturing a non-pneumatic tire in accordance with the subject matter of the present disclosure can include supporting a first lateral-pressure member on a first mold section that has a longitudinally-extending mold axis. The first lateral-pressure member can include a pressure-member wall that includes a first edge surface portion and a second edge surface portion opposite the first edge surface portion. The method can also include providing a less-than-fully-cured non-pneumatic tire that includes a plurality of support structures disposed in peripherally-spaced relation to one another and a plurality of spaces disposed in peripherally-spaced relation to one another with one of the plurality of spaces disposed between adjacent ones of the plurality of support structures. The method can further include inserting a first curing shoe into one of the plurality of spaces and inserting a second curing shoe into the same one of the plurality of spaces but in laterally-spaced relation to the first curing shoe. The method can also include positioning the less-than-fully-cured non-pneumatic tire along the first mold section such that the first lateral-pressure member is at least partially disposed within the one of the plurality of spaces with the first edge surface portion at least partially axially coextensive with the first curing shoe and with the second edge surface portion at least partially axially coextensive with the second curing shoe. The method can further include displacing the first lateral-pressure member and the less-than-fully-cured non-pneumatic tire relative to one another such that the first edge surface portion operatively engages the first curing shoe and the second edge surface portion operatively engages the second curing shoe thereby urging the first and second curing shoes laterally away from one another into engagement with and applying pressure to the less-than-fully-cured non-pneumatic tire. The method can also include curing the non-pneumatic tire.

One example of a mold assembly in accordance with the subject matter of the present disclosure, such as may be suitable for curing non-pneumatic tires, for example, can include first and second mold sections with a mold axis extending longitudinally therebetween. The first and second mold sections can be axially displaceable relative to one another between a first axial position and a second axial position. A first lateral-pressure member can have a first pressure-member axis and can be supported on the first mold section such that the first pressure-member axis is disposed in radially-offset relation to the mold axis. The first lateral pressure member can include a first pressure member wall with a first edge surface portion and a second edge surface portion opposite the first edge surface portion. A second lateral-pressure member can have a second pressure-member axis and can be supported on the second mold section such that the pressure-member axis is disposed in radially-offset relation to the mold axis and in approximate alignment with the first pressure-member axis. The second lateral-pressure member can include a second pressure member wall with a first edge surface portion and a second edge surface portion opposite the first edge surface portion. A first curing shoe can be dimensioned to cooperatively engage the first lateral-pressure member and an associated less-than-fully-cured non-pneumatic tire, and a second curing shoe can be dimensioned to abuttingly engage the second lateral-pressure member and the associated less-than-fully-cured non-pneumatic tire.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

Figure 1:
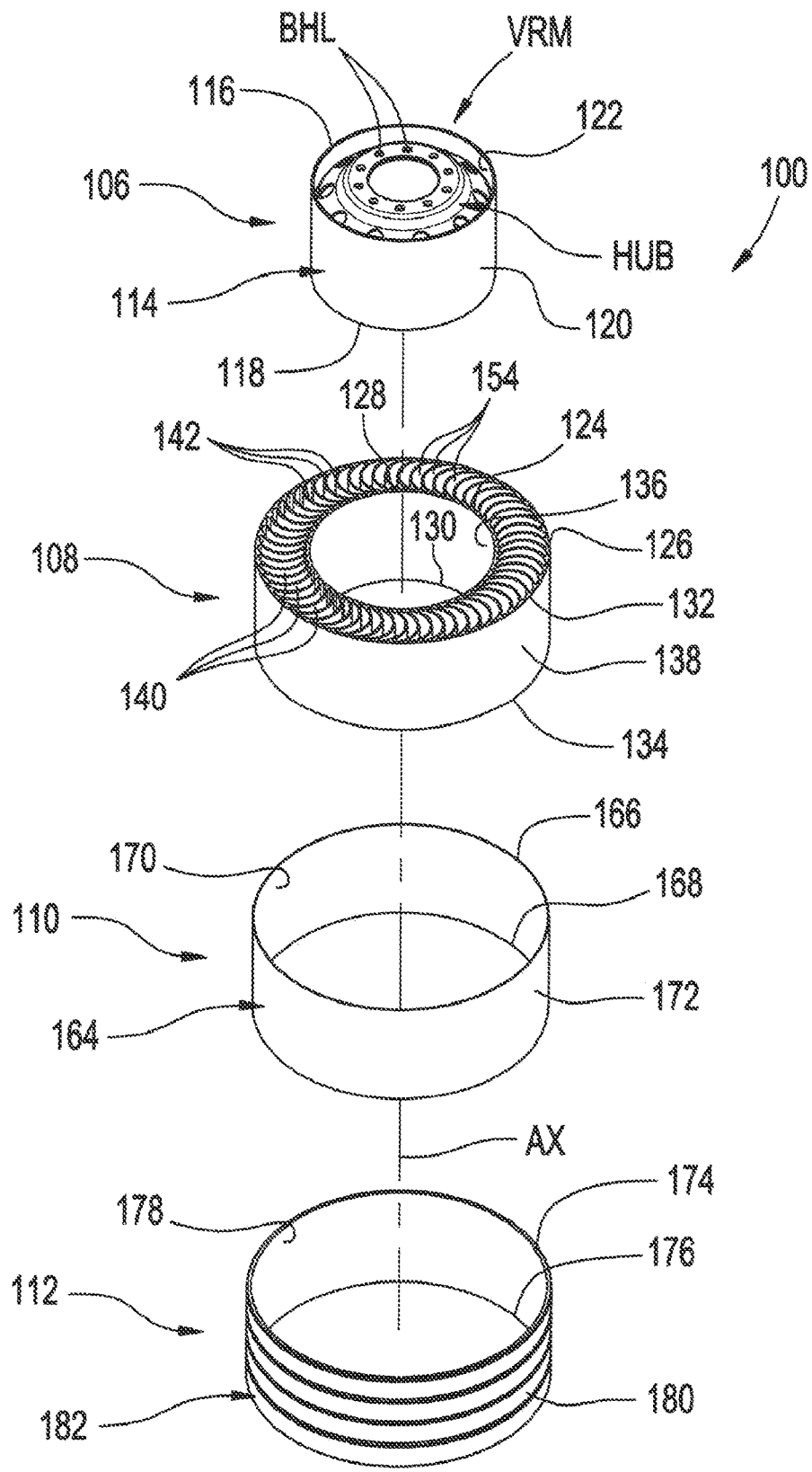
FIG. 1 is an exploded top perspective view of components of an exemplary less-than-fully-cured non-pneumatic tire shown prior to assembly.
Figure 2:
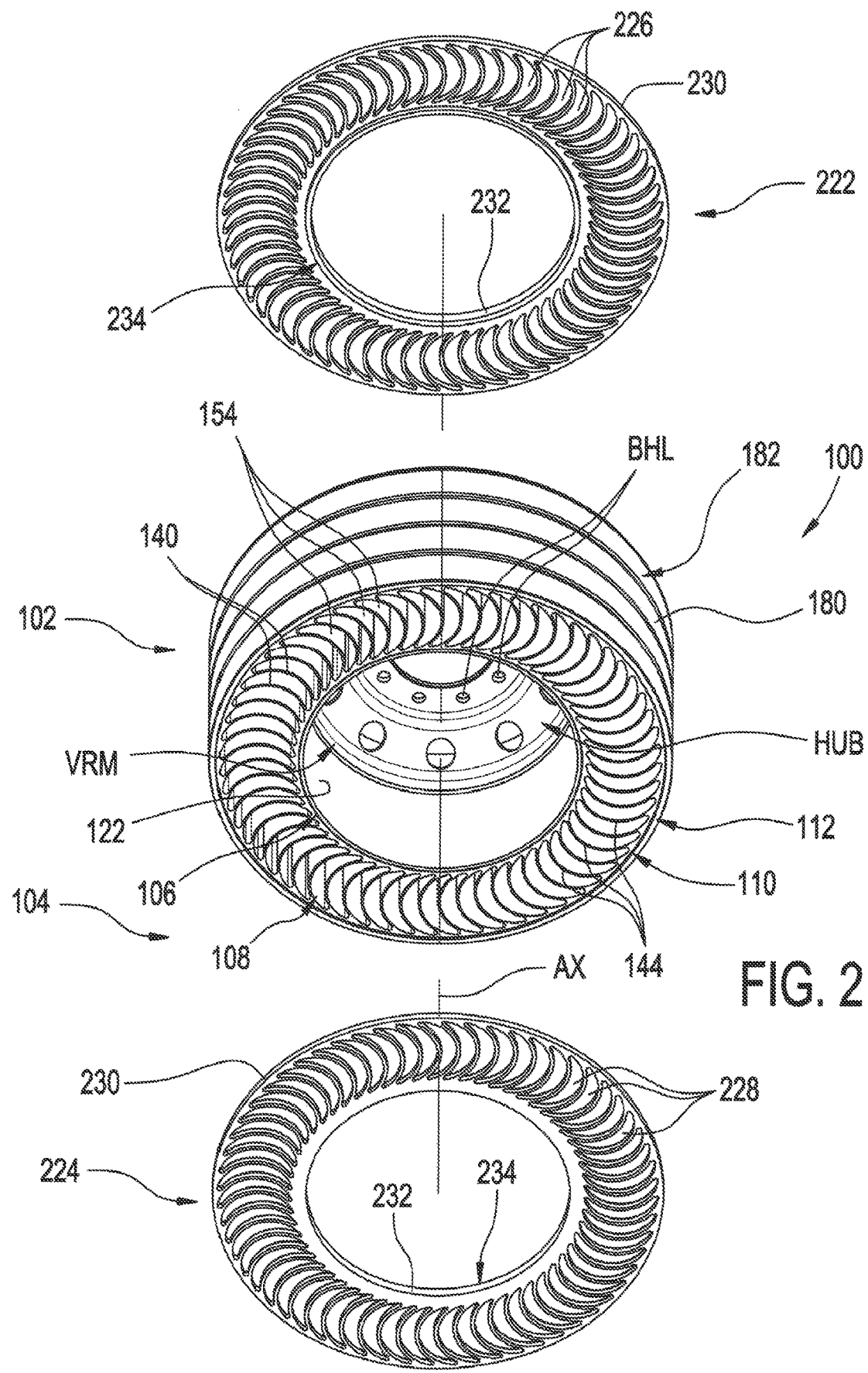
FIG. 2 is a bottom perspective view of the exemplary less-than-fully-cured non-pneumatic tire in an assembled condition and prepared for curing.

FIGS. 1 and 2 illustrate one example of a less-than-fully-cured non-pneumatic tire dimensioned and/or otherwise configured for curing in a mold assembly in accordance with the subject matter of the present disclosure and/or by way of a method of manufacture in accordance with the subject matter of the present disclosure. It will be appreciated that non-pneumatic tires of various of types, kinds and/or constructions have been developed and/or used in different applications and/or environments. As one non-limiting example, less-than-fully-cured non-pneumatic tire (or tire assembly) 100 is shown in FIGS. 1-10 as having a longitudinal axis AX and can extend axially from an end 102 to an end 104 that is opposite end 102. Less-than-fully-cured non-pneumatic tire 100 can include an annular ring 106 that extends peripherally about axis AX and a structure body 108 that is disposed outwardly of at least a portion of annular ring 106 and also extends peripherally about axis AX. Less-than-fully-cured non-pneumatic tire 100 can also include an annular ring 110 that extends peripherally around axis AX with at least a portion of annular ring 110 disposed outwardly of annular ring 106 and/or structure body 108. Less-than-fully-cured non-pneumatic tire 100 can further include a tread body 112 extending peripherally around axis AX with at least a portion of tread body 112 disposed outwardly of annular ring 110.

It will be appreciated that mold assemblies and methods of manufacture in accordance with the subject matter of the present disclosure are used to transition a non-pneumatic tire having one or more portions formed from a less-than-fully-cured elastomeric material into a non-pneumatic tire in which all or substantially all portions thereof are substantially-entirely cross-linked, vulcanized and/or otherwise cured. As such, it will be appreciated and understood that any one or more of the foregoing components of non-pneumatic tire 100 can include elastomeric material to be transitioned from a less-than-fully-cured condition to at least a substantially-entirely cured condition, and that arrangements of non-pneumatic tire 100 that are shown and described herein are merely exemplary and not intended to be limiting.

It will be appreciated that annular ring 106 can be of any suitable size, shape and/or configuration, and can include any suitable number of one or more walls and/or wall portions. As one non-limiting example, the annular ring could be a part of or otherwise at least partially form an outer wall or outer wall portion of a vehicle wheel or rim, such as is represented in FIGS. 1 and 2 by reference characters VRM. In such an exemplary arrangement, annular ring 106 can include a ring wall (or ring wall portion) 114 extending peripherally around longitudinal axis AX. Optionally, annular ring 106 can include a hub wall (or hub wall portion) HUB disposed inwardly of ring wall portion 114. If included, hub wall portion HUB can be operatively connected to ring wall portion 114. Additionally, if included, hub wall portion HUB can, optionally, be dimensioned and/or otherwise adapted for mounting in a conventional manner on or along an associated component or device, such as an axle of an associated vehicle by way of bolt holes BHL, for example.

Ring wall portion 114 of annular ring 106 can extend axially between a ring edge 116 disposed toward end 102 and a ring edge 118 that is disposed toward end 104 in axially-spaced relation to ring edge 116. Ring wall portion 114 can include an outer surface portion 120 that faces radially outward and extends peripherally about longitudinal axis AX and axially between ends 102 and 104. In some cases, ring wall portion 114 can, optionally, include an inner surface portion 122 that extends peripherally about longitudinal axis AX and faces radially inward axially along and/or between end 102 and/or end 104.

Structure body 108 can include an inner wrap or layer 124 and an outer wrap or layer 126 disposed radially outward of inner layer 124. Inner and outer layers 124 and 126 extend axially between ends 102 and 104 with inner layer 124 extending axially between edges 128 and 130 and outer layer 126 extending axially between edges 132 and 134. In some cases, inner and outer layers 124 and 126 can be substantially coextensive with one another such that edges 128 and 132 are at least approximately aligned with one another along end 102 and edges 130 and 134 are at least approximately aligned with one another along end 104.

Inner layer 124 can at least partially define an inside surface portion 136 of structure body 108 that extends peripherally around longitudinal axis AX and axially between ends 102 and 104. Outer layer 126 can at least partially define an outer surface portion 138 of structure body 108 that extends peripherally around longitudinal axis AX and axially between ends 102 and 104.

Structure body 108 also includes a plurality of support structures 140 that extend between and operatively interconnect inner and outer layers 124 and 126. It will be appreciated that support structures 140 can be of any suitable shape, configuration and/or arrangement, and can be operatively connected to inner and outer layers 124 and 126 in any suitable manner. As one non-limiting example, support structures 140 can extend axially from an edge 142 disposed toward end 102 to an edge 144 disposed toward end 104. Support structures 140 can also include an end 146 disposed toward inner layer 124 and an end 148 disposed toward outer layer 126 in spaced relation to end 146. Support structures 140 are shown and described herein as having a curved or otherwise non-linear profile along a plane taken transverse to longitudinal axis AX. Support structures 140 are shown and described as having a concave surface portion 150 facing one circumferential direction about longitudinal axis AX and a convex surface portion 152 facing the opposite circumferential direction. It will be appreciated, however, that such configurations are merely exemplary and that support structures with other shapes and/or profiles could alternately be used without departing from the subject matter of the present disclosure.

Support structures 140 are disposed in peripherally-spaced relation to one another around longitudinal axis AX such that a plurality of spaces 154 are also disposed in peripherally-spaced relation to one another around the longitudinal axis with one of spaces 154 disposed between adjacent ones of support structures 140. In such an arrangement, spaces 154 can have an arcuate, curved or otherwise approximately crescent-shaped cross-sectional profile or configuration with concave surface portion 150 of one support structure 140 and convex surface portion 152 of an adjacent support structure 140 at least partially defining peripherally-spaced sides of spaces 154. In some cases, support structures 140 can extend into or otherwise be at least partially embedded within inner layer 124 and/or outer layer 126. In such cases, a portion 156 of inner layer 124 can at least partially define an end surface portion 158 of spaces 154, such as may have a curved or otherwise non-linear cross-sectional shape and/or configuration. Additionally, or in the alternative, a portion 160 of outer layer 126 can at least partially define an end surface portion 162 of spaces 154, such as may have a curved or otherwise nonlinear cross-sectional shape and/or configuration.

It will be appreciated that annular ring 110 can be of any suitable size, shape and/or configuration, and can include any suitable number of one or more walls and/or wall portions. As one non-limiting example, annular ring 110 can include a ring wall (or ring wall portion) 164 extending peripherally around longitudinal axis AX. Ring wall portion 164 can extend axially between a ring edge 166 disposed toward end 102 and a ring edge 168 that is disposed toward end 104 in axially-spaced relation to ring edge 166. Ring wall portion 164 can include an inner surface portion 170 that faces radially inward and extends peripherally about longitudinal axis AX and axially along and/or otherwise between ends 102 and 104. Ring wall portion 164 can also include an outer surface portion 172 that extends peripherally about longitudinal axis AX and faces radially outward axially along and/or between end 102 and/or end 104.

Tread body 112 can extend axially between ends 102 and 104 with a tread edge 174 disposed along end 102 and a tread edge 176 disposed along end 104. Tread body 112 can also include an inside surface portion 178 that faces radially inward and an outer surface portion 180 that faces radially outward. One or more tread structures 182 (e.g., grooves, ribs, lugs, sipes) can, optionally, be pre-formed on or otherwise extend into tread body 112 from along outer surface portion 180 of less-than-fully-cured non-pneumatic tire 100 with such tread structures adapted during the curing process to at least partially define a ground-engaging tread (or tread pattern) on the cured non-pneumatic tire.

As discussed above, one or more walls and/or wall portions of non-pneumatic tire 100 can be formed from an elastomeric material that is in a less-than-fully-cured condition such that at least these walls and/or wall portions are curable using a mold assembly and/or method of manufacture in accordance with the subject matter of the present disclosure. For example, tread body 112 can be at least partially formed from a less-than-fully-cured elastomeric material. Additionally, or in the alternative, one or more of inner layer 124 and/or outer layer 126 of structure body 108 can be at least partially formed from a less-than-fully-cured elastomeric material. As a further example, and/or as another alternative, support structures 140 can, optionally, include one or more layers of less-than-fully-cured elastomeric material. As non-limiting examples of such constructions, support structures 140 can, in some cases, be at least partially formed from sheets of comparatively-rigid material (e.g., metal, fiber-reinforced composite) of which ends 146 and 148 can, respectively, be at least partially embedded or otherwise disposed within inner and outer layers 124 and 126 of structure body 108. Additionally, or in the alternative, a layer of less-than-fully-cured elastomeric material can extend along and/or at least partially define concave surface portion 150 and/or convex surface portion 152. As another non-limiting example, support structures 140 can be at least partially formed from a plurality of comparatively-rigid wires and/or filaments arranged adjacent one another and at least partially embedded in a quantity of less-than-fully-cured elastomeric material to at least partially form a sheet-like structure.

It will be appreciated that less-than-fully-cured non-pneumatic tire 100 can include any suitable elastomeric material or combination of elastomeric materials, such as natural rubbers, synthetic rubbers and/or thermoplastic elastomers, for example. Additionally, it will be recognized and appreciated, in some cases, a variety of components can be formed from a common less-than-fully-cured elastomeric material. In other cases, however, less-than-fully-cured elastomeric materials of two or more compositions, compounds and/or grades can be used. Terms such as "less-than-fully-cured," and the like, as used herein refer to elastomeric materials having polymer chains that become cross-linked or otherwise bonded when subjected to heat, pressure and/or chemical compounds with "fully cured" or "substantially fully cured" elastomeric materials exhibiting substantially different material and/or mechanical properties than "less-than-fully-cured" elastomeric materials. One non-limiting example of a suitable curing process includes vulcanization of natural and synthetic rubber elastomers.

It will be appreciated that any combination of one or more less-than-fully-cured elastomeric materials can be used or otherwise included in a less-than-fully-cured non-pneumatic tire (e.g., non-pneumatic tire 100). As one non-limiting example, less-than-fully-cured non-pneumatic tire 100 can include one or more quantities of elastomeric material substantially all of each of which is in a "green" or substantially-entirely uncured condition. As another non-limiting example, less-than-fully-cured non-pneumatic tire 100 can include one or more quantities of elastomeric material that is/are in a "green" or substantially-entirely uncured condition and one or more quantities of elastomeric material that is/are in an at least partially cured condition. As a further non-limiting example, less-than-fully-cured non-pneumatic tire 100 can include one or more quantities of elastomeric material that is/are in a partially but not entirely cured condition. As such, it is to be recognized and appreciated that less-than-fully-cured non-pneumatic tire 100 can include, without limitation: one or more quantities of "green" or substantially-entirely uncured elastomeric material; or, one or more quantities of partially but not fully cured elastomeric material; or, both one or more quantities of "green" or substantially-entirely uncured elastomeric material and one or more quantities of partially but not fully cured elastomeric material.

Figure 3:
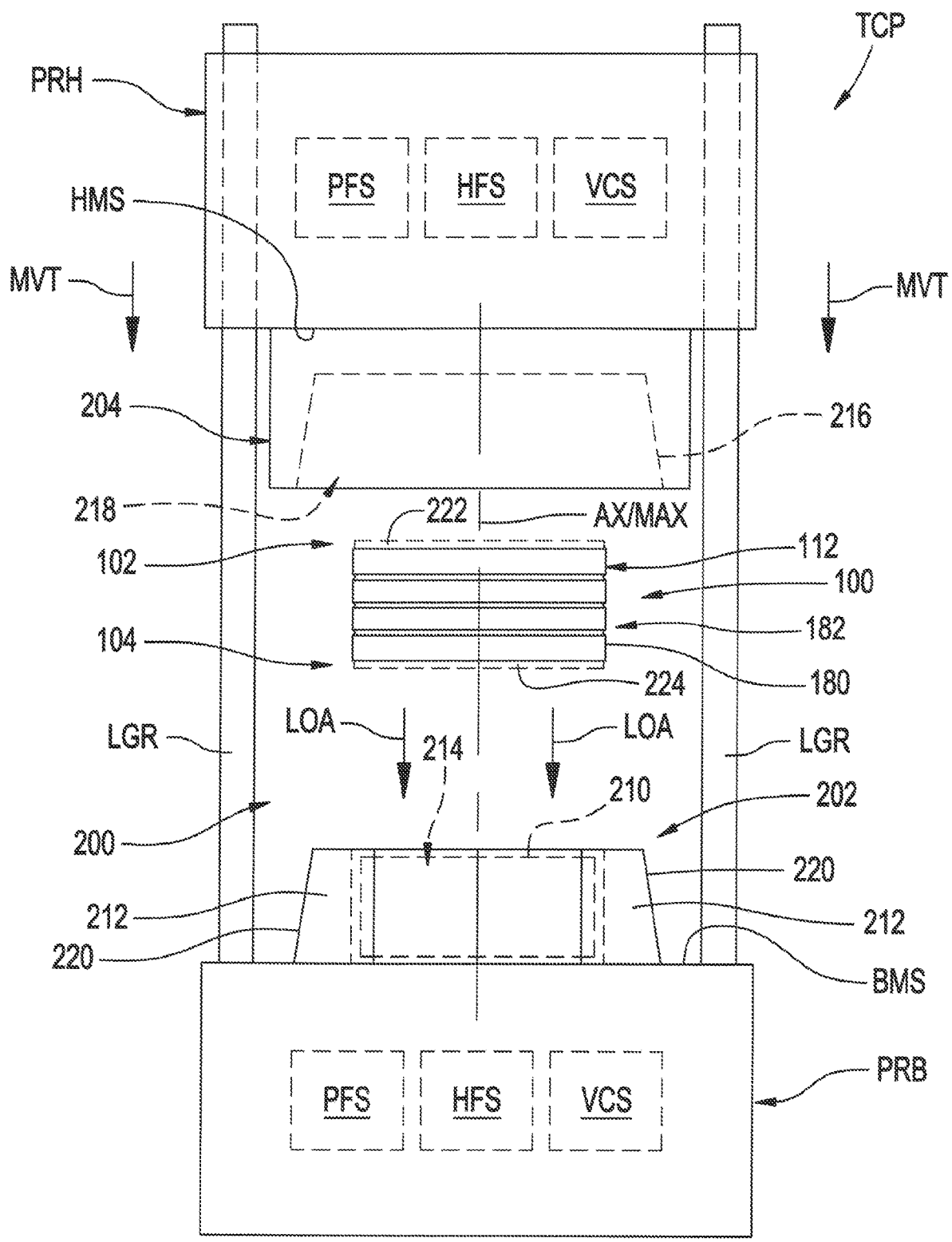
FIG. 3 is a front elevation view of a tire curing press shown with a mold assembly in an open condition and the exemplary less-than-fully-cured non-pneumatic tire being loaded.
Figure 4:
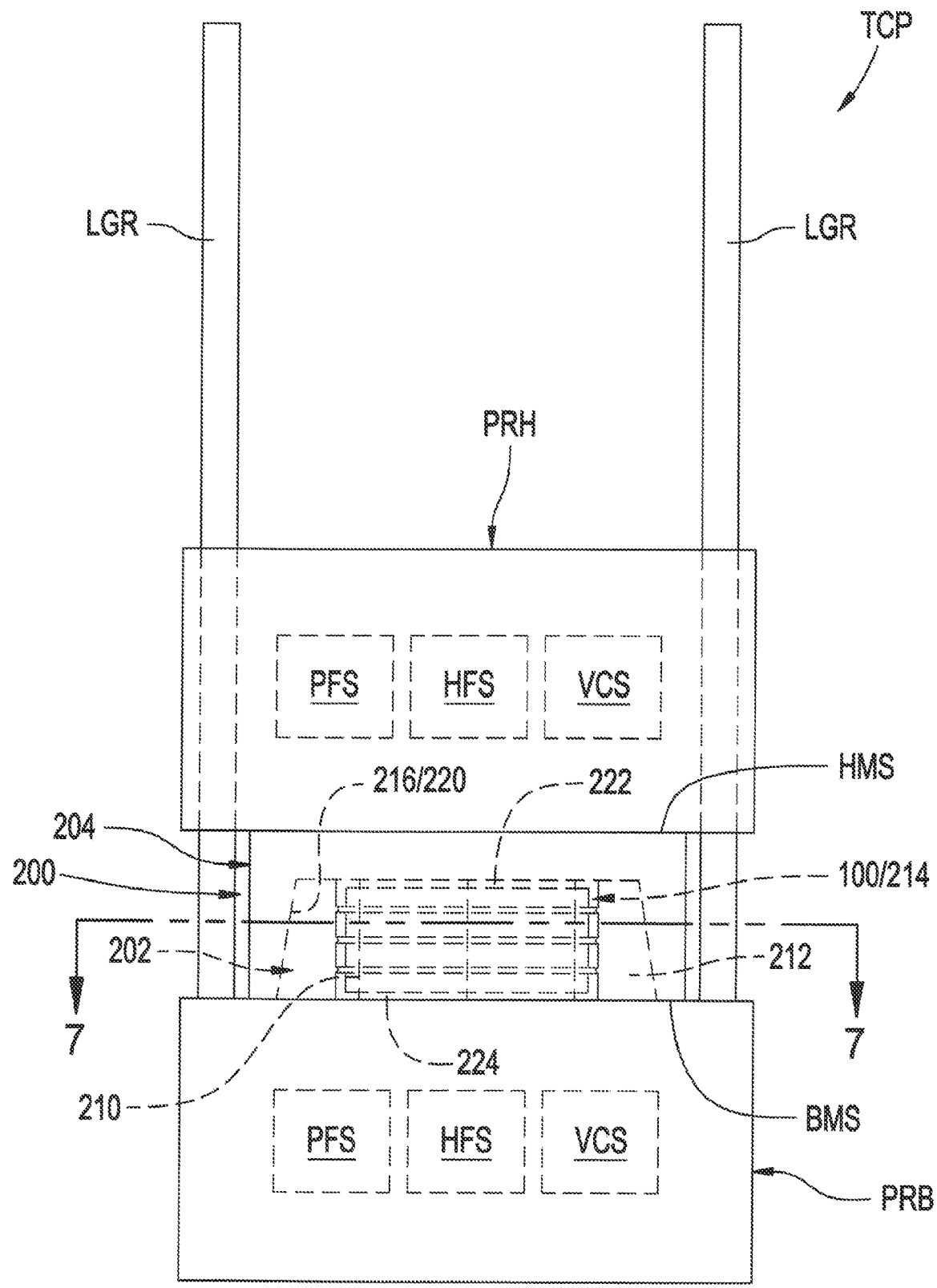
FIG. 4 is a front elevation view of the tire curing press of FIG. 3 shown with the mold assembly in a closed condition and the exemplary less-than-fully-cured non-pneumatic tire loaded for curing.

FIGS. 3 and 4 schematically illustrate an otherwise conventional tire curing press TCP that includes a press base PRB with a base mounting surface BMS. Tire curing press TCP also includes a press head PRH with a head mounting surface HMS. Press head PRH is moveable relative to press base PRB, such as along linear guide rods LGR, for example, in a conventional manner. Press head PRH is shown in FIG. 3 as being disposed in a first or raised position that is moveable to a second or lowered position shown in FIG. 4, which movement is represented in FIG. 3 by arrows MVT. Tire curing press TCP can include one or more pressurized fluid sources, one or more heated fluid sources and/or one or more vacuum sources, such as are schematically represented in FIGS. 3 and 4 by dashed boxes PFS, HFS and VCS, respectively, and can be included on, along or be otherwise operatively associated with press base PRB and/or press head PRH, as is well known in the art.

A mold assembly 200 in accordance with the subject matter of the present disclosure is shown in FIGS. 3-9 as being operatively supported within or otherwise on or along tire curing press TCP. Mold assembly 200 includes a mold section 202 that is supported on or along base mounting surface BSM of press base PRB and a mold section 204 that is supported on or along head mounting surface HMS of press head PRH. Mold sections 202 and/or 204 can be operatively connected in fluid communication with pressurized fluid source PFS and/or vacuum source VCS in any manner suitable for transferring pressurized fluid to and/or from the mold sections, such as by way of one or more conduits or passages 206, for example. Additionally, or in the alternative, mold sections 202 and 204 can be operatively connected in fluid communication with heated fluid source HFS and/or vacuum source VCS in any manner suitable for transferring fluid (heated or otherwise) to and/or from the mold sections, such as by way of one or more of conduits or passages 208, for example.

Mold assembly 200 includes a mold axis MAX extending in or otherwise along the direction of movement MVT of tire curing press TCP. As such, mold sections 202 and 204 are axially displaceable relative to one another during operation of the tire curing press with mold sections 202 and 204 shown spaced apart in FIG. 3 representing an open condition of the mold assembly and with mold sections 202 and 204 shown coextensively engaged with one another in FIG. 4 representing a closed condition of the mold assembly. Mold section 202 includes an interstitial curing system 210 and a plurality of tread die segments 212 that are disposed peripherally about interstitial curing system 210 to at least partially define a mold cavity 214 within mold section 202. Mold section 204 includes a surface portion 216 that at least partially defines a mold cavity 218 within the mold section. Mold cavity 218 is dimensioned to receive at least a portion of mold section 202 in a closed condition of the mold assembly. In some cases, an outer surface portion 220 of tread die segments 212 can abuttingly engage surface portion 216 of mold section 204 as the mold sections move toward the closed condition.

For example, with a less-than-fully-cured non-pneumatic tire 100 loaded into or otherwise positioned at least partially within mold cavity 214, as is represented in FIG. 3 by arrows LOA and shown in FIG. 4, tread die segments 212 are displaced radially inward into engagement with tread body 112 of less-than-fully-cured non-pneumatic tire 100. Such radial compression urges inside surface portion 178 of tread body 112 into engagement with outer surface portion 172 of annular ring 110. Additionally, such radial compression urges inner surface portion 170 of annular ring 110 into engagement with outer surface portion 138 of structure body 108. In some cases, such radial compression can also urge inside surface portion 136 of structure body 108 into engagement with outer surface portion 120 of annular ring 106. Furthermore, tread die segments 212 include features formed therealong generally opposite surface portion 220 that extend into engagement with tread body 112 from along outer surface portion 180 thereof under such radial compression to at least partially define ground-engaging tread pattern (e.g., grooves, ribs, lugs, sipes) on or along non-pneumatic tire 100.

As shown in FIGS. 2-6 and 9, in some cases, a support plate 222 can be disposed along end 102 of less-than-fully-cured non-pneumatic tire 100. Additionally, or in the alternative, a support plate 224 can be disposed along end 104 of less-than-fully-cured non-pneumatic tire 100. If included, support plate 222 and/or 224 can aid in maintaining annular ring 106, structure body 108, annular ring 110 and/or tread body 112 in a desired axial position relative to one another (e.g., approximate axial alignment), such as during transport to tire curing press TCP, loading/unloading of non-pneumatic tire 100 into and/or out of mold assembly 200 (or a mold section thereof), and/or to rotationally index or otherwise position support structures 140 and/or spaces 154 around longitudinal axis AX relative to interstitial curing system 210 and/or other features of mold assembly 200. If included, support plates 222 and/or 224 can include a plurality of openings 226 and 228, respectively, that have a shape, configuration and/or arrangement complementary to support structures 140 and/or spaces 154 of less-than-fully-cured non-pneumatic tire 100 (e.g., radially offset from axis AX and disposed at a common peripheral spacing). As such, support plates 222 and/or 224, if included, together with non-pneumatic tire 100 can be positioned within mold cavity 214 and/or can be operatively engaged co-extensively with interstitial curing system 210. Support plates 222 and 224 also include an outer peripheral edge 230 that has, in a preferred arrangement, an outer cross-sectional dimension that is approximately equal to or less the outermost cross-sectional dimension of non-pneumatic tire 100 (e.g., diametrically across tread body 112). Additionally, in some cases, support plates 222 and 224 can, optionally, include an inner peripheral edge 232. Furthermore, in some cases, support plates 222 and 224 can, optionally, include an alignment ridge 234 dimensioned to operatively engage a portion of less-than-fully-cured non-pneumatic tire 100

(e.g., inner surface portion 122 of annular ring 106) such that alignment ridge 234 is axially coextensive with a portion of the non-pneumatic tire.

Figure 7:
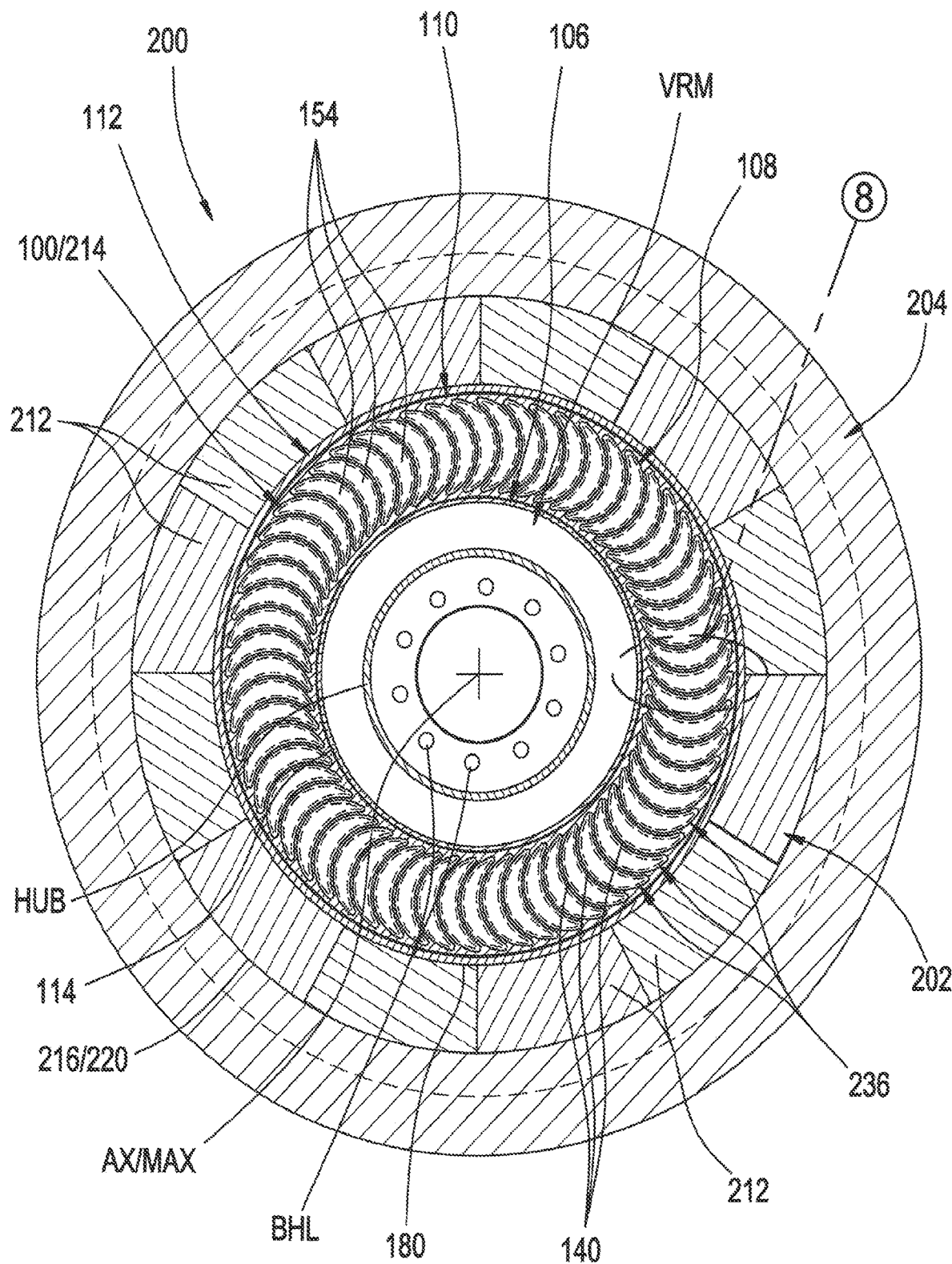
FIG. 7 is a cross-sectional top plan view of the mold assembly and exemplary less-than-fully-cured non-pneumatic tire in FIGS. 3-6 taken from along line 7-7 in FIG. 4.

As shown in FIGS. 5-11, interstitial curing system 210 includes a plurality of curing shoe assemblies 236, represented by dashed lines in FIG. 7, that are radially offset from mold axis MAX and arranged in peripherally-spaced relation to one another around the mold axis. Curing shoe assemblies 236 can include a shoe assembly axis SAX. In a preferred arrangement, curing shoe assemblies 236 are arranged such that one or more of the curing shoe assemblies is disposed within one of spaces 154 when less-than-fully-cured non-pneumatic tire 100 is positioned within mold cavity 214. In such an arrangement, curing shoe assemblies 236 can be selectively actuated and de-actuated (or otherwise released) such that curing shoes thereof correspondingly engage and disengage one or more walls and/or wall portions of structure body 108. In an engaged condition, the curing shoe assemblies can apply surface pressure and/or transfer heat into structure body 108, such as may operate to transition one or more walls and/or wall portions of the structure body that are formed from a less-than-fully-cured elastomeric material into a substantially-cured elastomeric material.

That is, in an actuated condition, curing shoe assemblies 236 can abuttingly engage and thereby apply pressure and/or transfer heat to inner layer 124 of structure body 108. In such an arrangement, the application of pressure by the curing shoe assemblies urges the inner layer toward annular ring 106. Additionally, or in the alternative, curing shoe assemblies 236 can, in an actuated condition, abuttingly engage and thereby apply pressure and/or transfer heat to outer layer 126 of structure body 108. In such an arrangement, the application of pressure by the curing shoe assemblies urges the outer layer toward annular ring 110. Furthermore, and/or as another alternative, curing shoe assemblies 236 can, in an actuated condition, abuttingly engage and thereby apply pressure and/or transfer heat to support structures 140 with adjacent curing shoe assemblies 236 applying pressure and/or transferring heat to the support structure disposed therebetween. In some cases, curing shoe assemblies 236 can apply pressure and/or heat on or along ends 146 and/or 148 of the support structure thereby ensuring ends 146 and/or 148 are in embedded engagement with inner and outer layers 124 and 126, respectively.

It will be appreciated that curing shoe assemblies in accordance with the subject matter of the present disclosure can be of any suitable type, kind and/or configuration, and can be operatively connected on and/or along mold section 202 and/or 204 in any suitable manner. In some cases, each of curing shoe assemblies 236 can be supported on or along mold section 202. In other cases, each of curing shoe assemblies 236 can be supported on or along mold section 204. In still other cases, one or more of curing shoe assemblies 236 can be supported on or along mold section 202 with the remainder of curing shoe assemblies 236 supported on or along mold section 204, such as in an alternating or interleaved arrangement, for example.

It will be appreciated that interstitial curing system 210 can be operatively engaged with less-than-fully-cured non-pneumatic tire 100 in any suitable manner. As one non-limiting example, the interstitial curing system can extend into engagement with the non-pneumatic tire from along one end thereof (e.g., end 102). As another non-limiting example, the interstitial curing system can extend into engagement with the non-pneumatic tire from along the other end thereof (e.g., end 104). As a further non-limiting example, interstitial curing system 210 can include a curing system section 238 adapted to extend into engagement with less-than-fully-cured non-pneumatic tire 100 from along end 102 thereof and a curing system section 240 adapted to engage the non-pneumatic tire from along end 104 thereof. In such an arrangement, curing system section 238 can be operatively supported on or along mold section 202 of mold assembly 200 and can include some or all components of one or more of curing shoe assemblies 236. Additionally, or in the alternative, curing system section 240 can be operatively supported on or along mold section 204 of the mold assembly and can include some or all components of one or more of curing shoe assemblies 236. In this manner, curing system sections 238 and 240 can be moved toward and away from one another along mold axis MAX such that any curing shoe assemblies 236 thereof can be moved into and/or out of engagement with non-pneumatic tire 100 during operation of tire curing press TCP, such as has been described above.

As a non-limiting example, curing shoe assemblies 236 can, in some cases, include a lateral-pressure member 242. Additionally, or in the alternative, curing shoe assemblies 236 can, in some cases, include a lateral-pressure member 244. In the exemplary arrangement shown in FIGS. 5-11, curing system section 238 includes a plurality of lateral-pressure members 242 that are disposed in peripherally-spaced relation to one another about mold axis MAX. Additionally, or in the alternative, curing system 240 can include a plurality of lateral-pressure members 244 disposed in peripherally-spaced relation to one another about the mold axis. In some cases, lateral-pressure members 242 and 244 are disposed at a common peripheral spacing about mold axis MAX and otherwise in approximate alignment with one another such that, in an actuated or engaged condition, lateral-pressure members 242 and lateral-pressure members 244 extend into plurality of spaces 154 from along ends 102 and 104, respectively, of non-pneumatic tire 100 with one of lateral-pressure members 242 and/or 244 in each of spaces 154.

It will be recognized and appreciated that direct sliding engagement of lateral-pressure members 242 and/or 244 with less-than-fully-cured elastomeric material of non-pneumatic tires 100 could result in undesirable deformation of the less-than-fully-cured elastomeric material, such as axial and/or radial deformation of the less-than-fully-cured elastomeric material as lateral-pressure members 242 and/or 244 move into and/or out of axially-coextensive relation with the non-pneumatic tire. As such, curing shoe assemblies 236 can include one or more curing shoes and/or curing shoe segments that are positioned in abutting engagement with the less-than-fully-cured elastomeric material of non-pneumatic tire 100. In such cases, the one or more curing shoes and/or curing shoe segments are positioned axially coextensively with the non-pneumatic tire and are retained an at least approximate axial position relative to the non-pneumatic tire as lateral-pressure members 242 and/or 244 moved into and/or out of axially-coextensive relation with the non-pneumatic tire and the curing shoes and/or curing shoe segments disposed therealong.

The curing shoes and/or curing shoe segments are dimensioned to cooperatively engage lateral-pressure members 242 and/or 244 such that axial displacement of and/or axial forces applied to the lateral-pressure members generate lateral displacement of the curing shoes and/or curing shoe segments thereby applying lateral (e.g., compressive) pressure to the less-than-fully-cured elastomeric material of non-pneumatic tire 100, such as is discussed above in detail. As one non-limiting example, surface portions of the lateral-pressure members can slidingly engage corresponding surface portions of the curing shoes and/or curing shoe segments with the direction of sliding action disposed at an acute angle relative to mold axis MAX such that axial displacement of the lateral-pressure members generates lateral displacement of the curing shoes and/or curing shoe segments. In such an arrangement, the curing shoes and/or curing shoe segments can be actuated and/or de-actuated (or otherwise released or retracted) during a manufacturing process in accordance with the subject matter of the present disclosure by axially moving the lateral-pressure members into and/or out of engagement with the curing shoes (or segments thereof).

Figure 5:
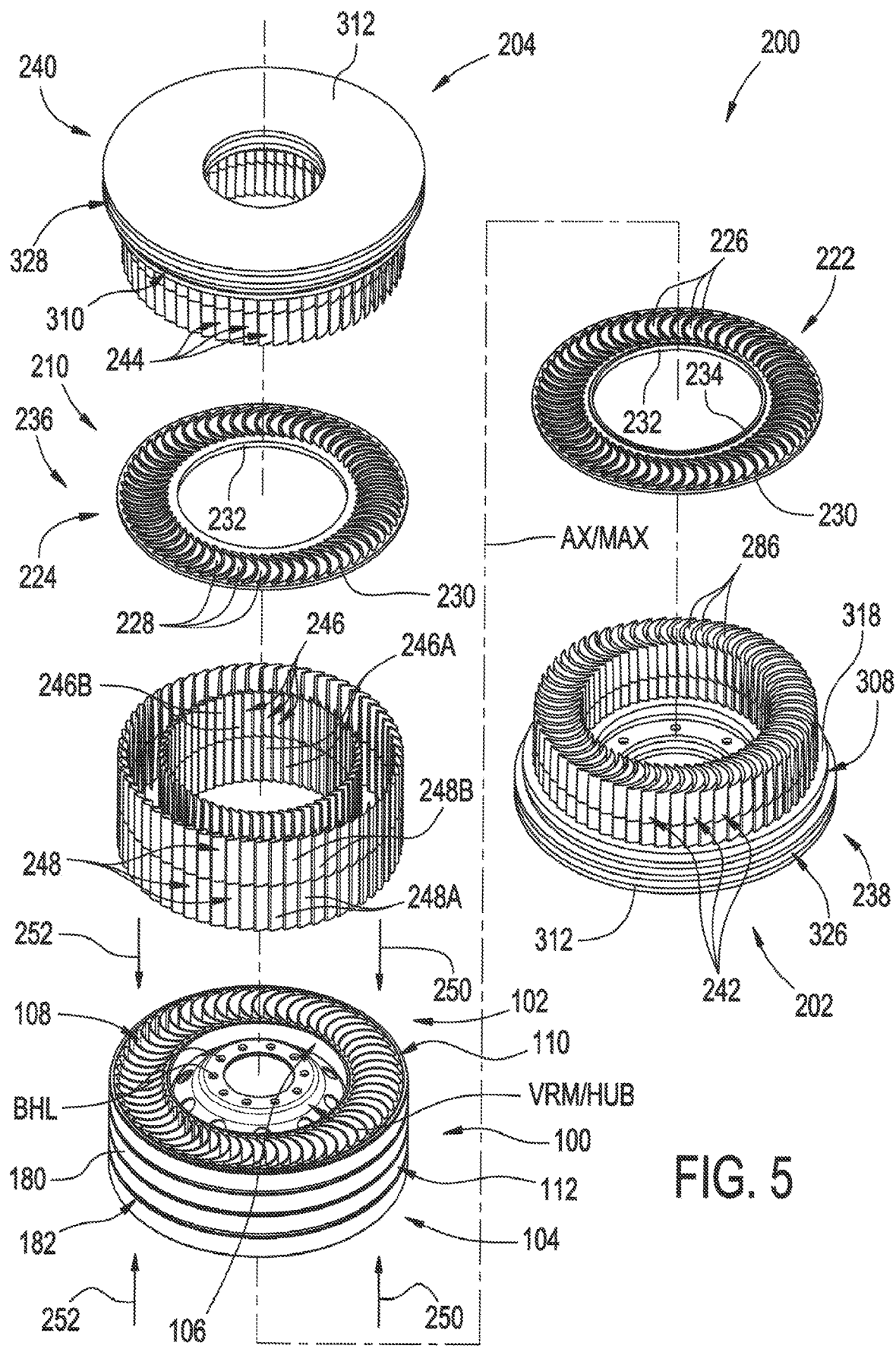
FIG. 5 is an exploded top perspective view of the mold assembly showing an exemplary interstitial curing system prior to loading of the exemplary less-than-fully-cured non-pneumatic tire.
Figure 6:
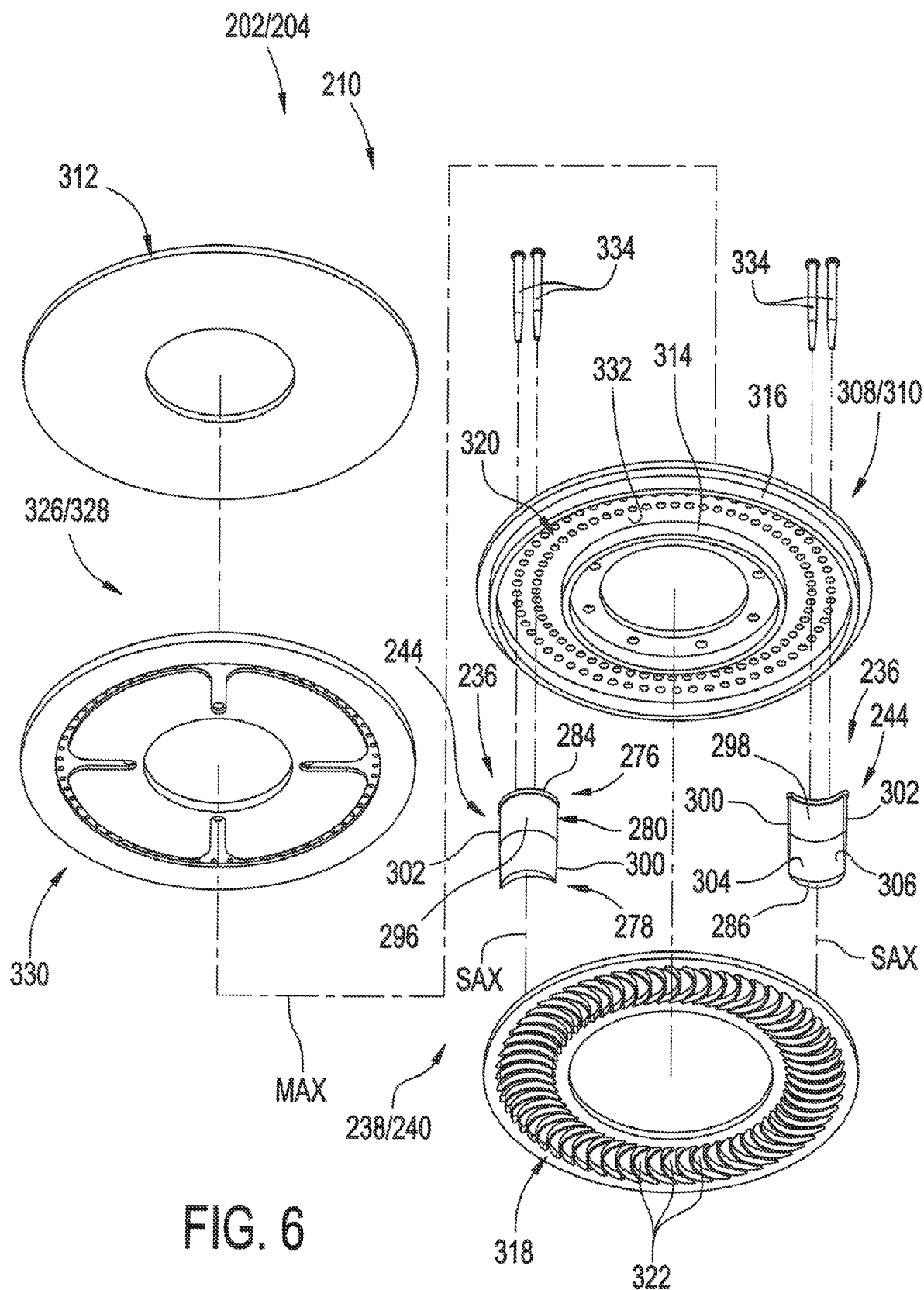
FIG. 6 is an exploded bottom perspective view of the exemplary interstitial curing system in FIG. 5.

As one non-limiting example, curing shoe assemblies 236 are shown in FIGS. 5-11 as including curing shoes 246 and 248, which can include any combination of walls, wall portions, surfaces and/or surface portions. In some cases, curing shoes 246 and/or 248 can include two or more curing shoe segments, such as are identified as curing shoe segments 246A and 246B of curing shoes 246 and curing shoe segments 248A and 248B of curing shoes 248. In some cases, the curing shoe segments can be provided separately from one another. In other cases, curing shoe segments 246A and 246B can be secured together to at least partially form curing shoes 246, and/or curing shoe segments 248A and 248B can be secured together to at least partially form curing shoes 248. A plurality of curing shoes 246 and/or a plurality of curing shoe segments 246A and/or 246B can be inserted or otherwise positioned within corresponding ones of openings 154 from along end 102 and/or end 104 of non-pneumatic tire 100, such as is represented in FIG. 5 by arrows 250. Additionally, or in the alternative, a plurality of curing shoes 248 and/or a plurality of curing shoe segments 248A and/or 248B can be inserted or otherwise positioned within corresponding ones of openings 154 from along end 102 and/or end 104 of non-pneumatic tire 100, such as is represented in FIG. 5 by arrows 252.

It will be appreciated that curing shoes 246 and 248 (or any segments thereof) can be supported relative to one another on or along non-pneumatic tire 100 in any suitable manner and/or in any suitable orientation, such as may corresponds to curable features and/or elastomeric materials of less-than-fully-cured non-pneumatic tire 100. In some cases, curing shoes 246 and/or 248 (and/or any segments thereof) can include outer surface portions that abuttingly engage corresponding surface portions of the non-pneumatic tire (e.g., surface portions 158 and/or 162 of structure body 108) such that the curing shoes (or any segments thereof) are at least partially self-retaining. Additionally, or in the alternative, curing shoes 246 and/or 248 (or any segments thereof) can be retained in axial position within openings 154 by support plates 222 and/or 224.

Figure 8:
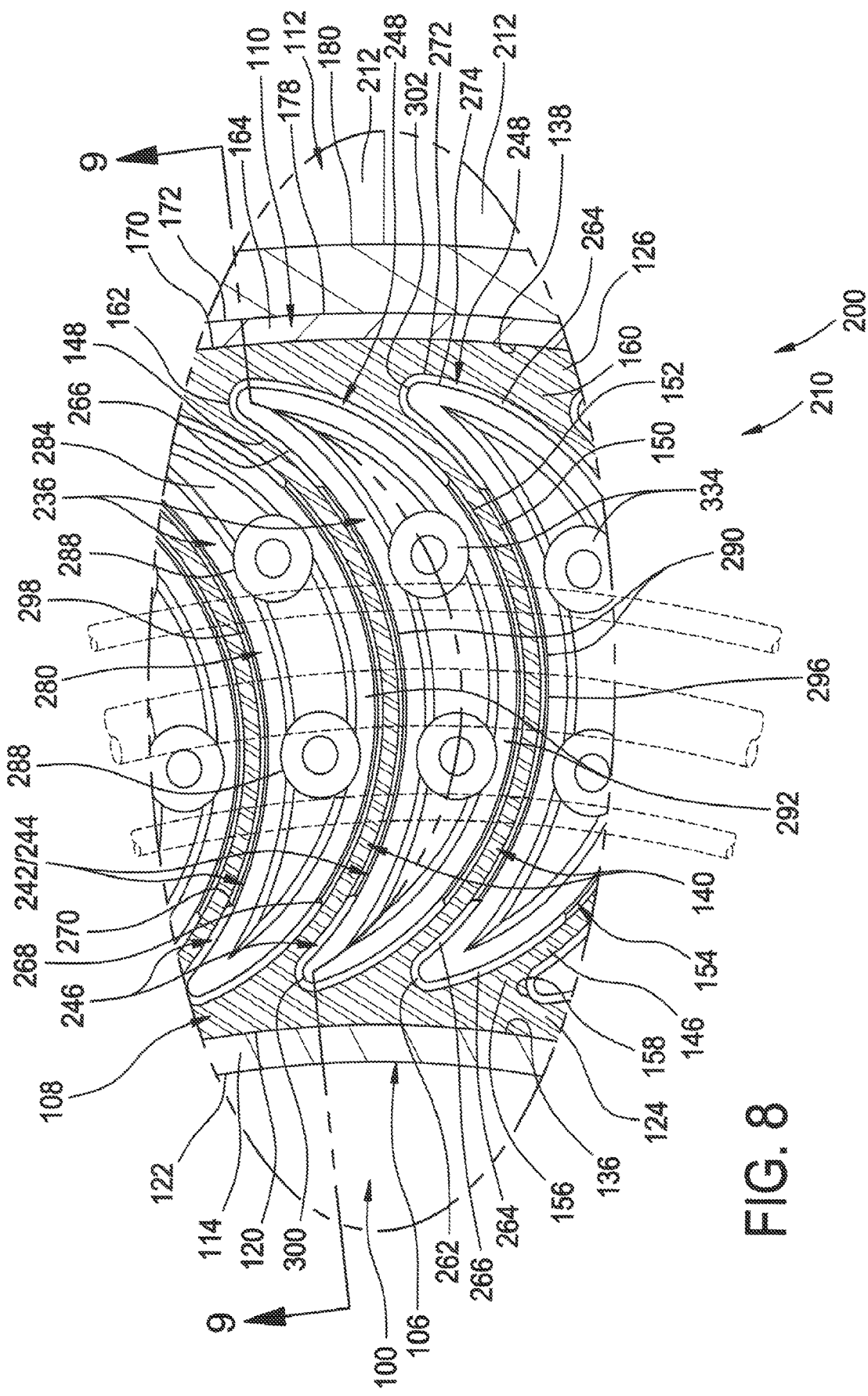
FIG. 8 is an enlarged view of the portion of the mold assembly and exemplary less-than-fully-cured non-pneumatic tire identified as Detail 8 in FIG. 7.
Figure 9:
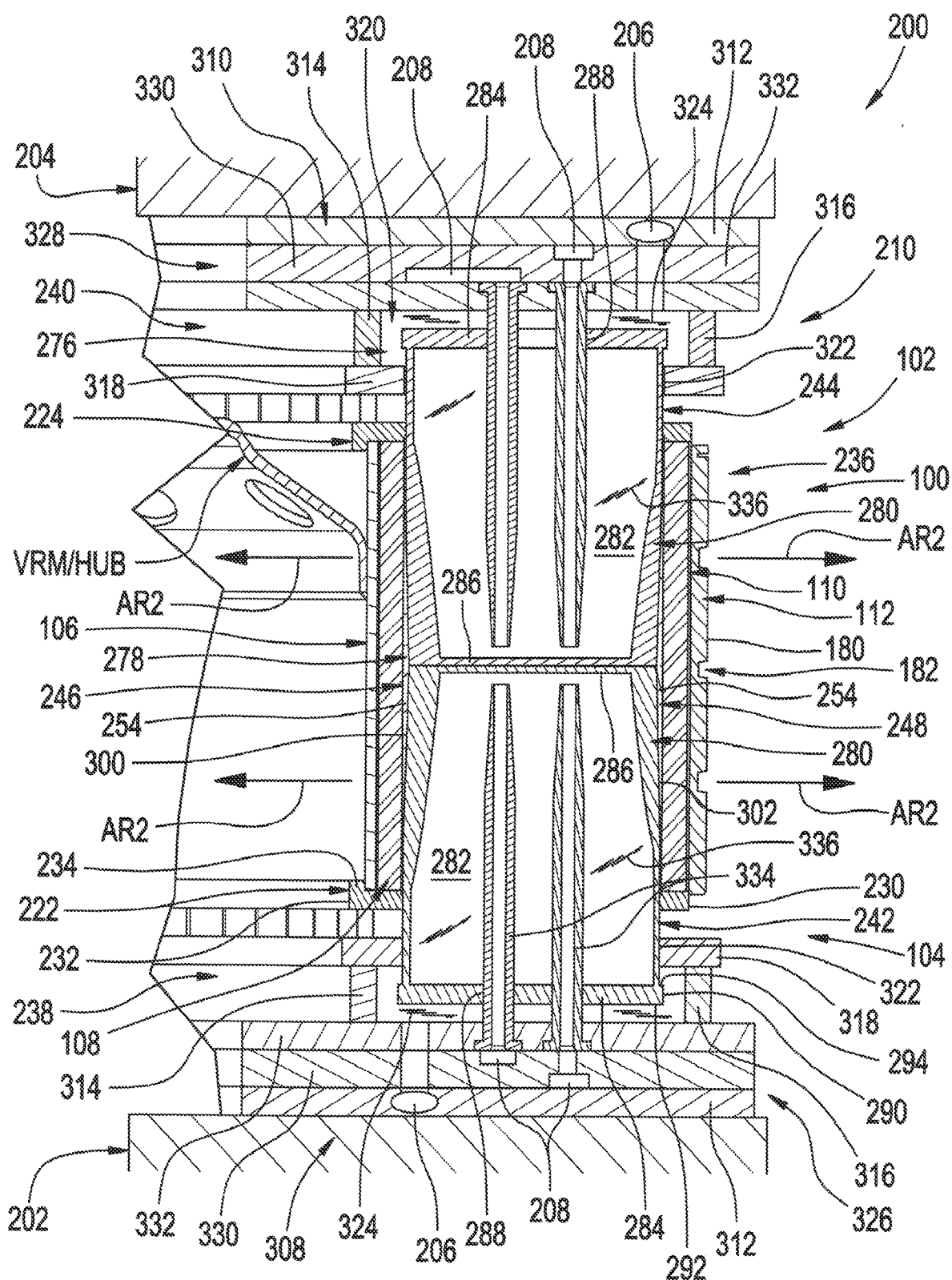
FIG. 9 is a cross-sectional side view of the mold assembly and exemplary less-than-fully-cured non-pneumatic tire in FIGS. 1-8 taken from along line 9-9 in FIG. 8.
Figure 10:
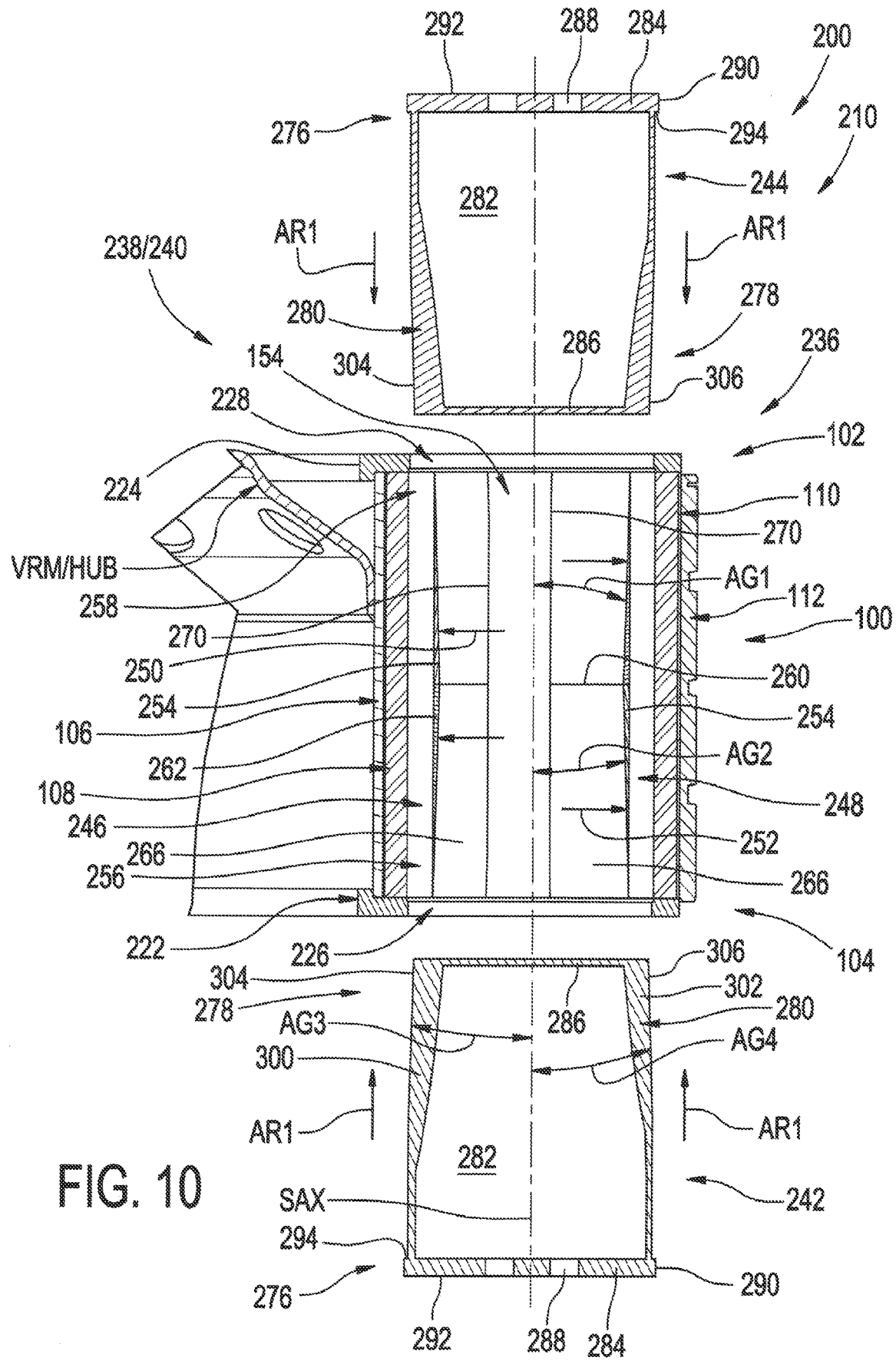
FIG. 10 is a partially-exploded cross-sectional side view of the exemplary lateral-pressure members and curing shoes shown in FIGS. 5-9.
Figure 11:
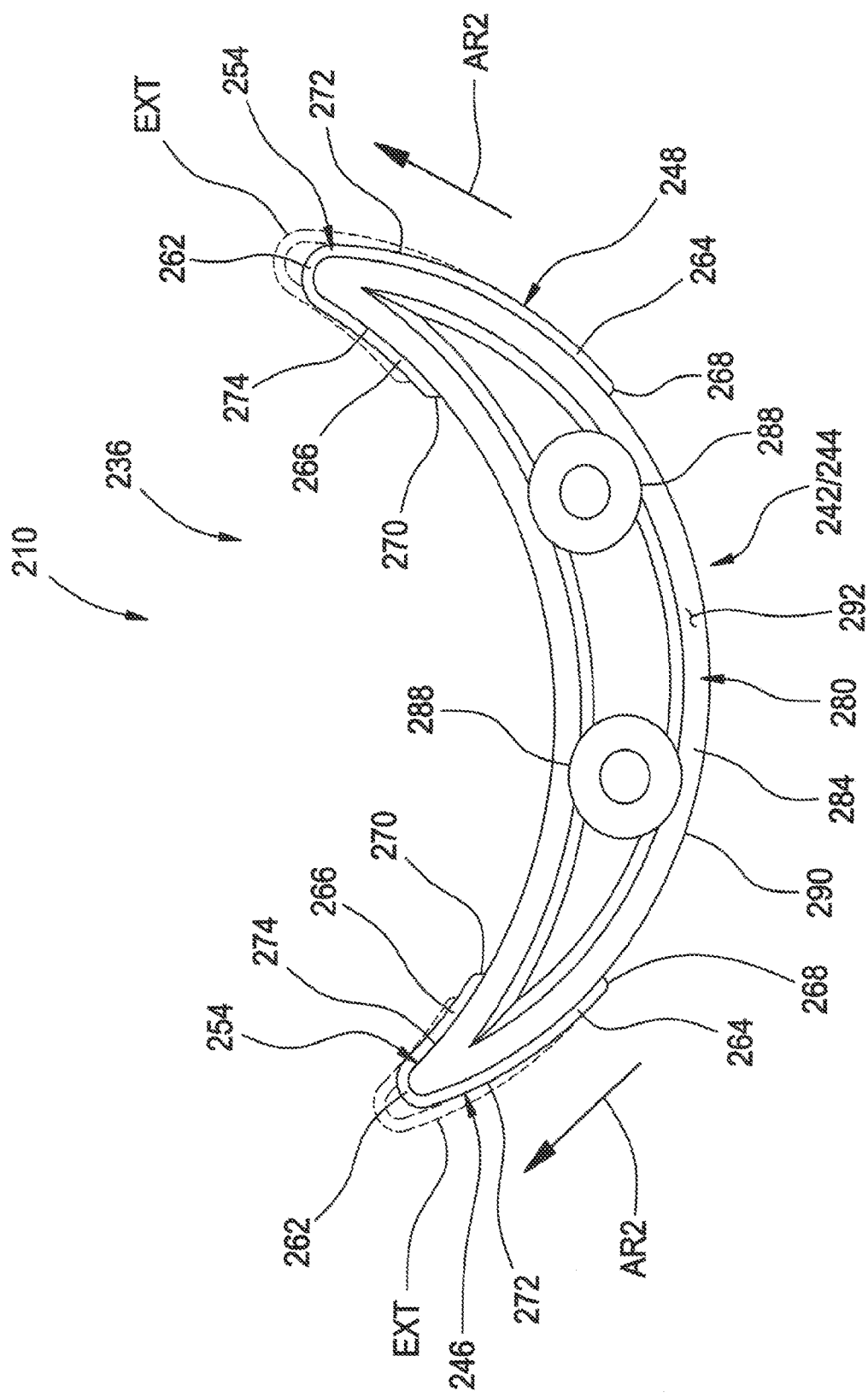
FIG. 11 is a top plan view of the exemplary lateral-pressure member and curing shoes shown in FIGS. 5-10.

As lateral-pressure members 242 and/or 244 are axially displaced into engagement with curing shoes 246 and/or 248 (or any segments thereof), such as is represented in FIG. 10 by arrows AR1, curing shoes 246 and 248 are displaced laterally between a retracted position (i.e., a de-actuated condition), which is shown in FIG. 11, and an extended position (i.e., an actuated condition), which is shown in FIGS. 8 and 9 and represented by dashed lines EXT in FIG. 11. It will be recognized and appreciated that the retracted position (i.e., de-actuated condition) is suitable for loading and unloading of non-pneumatic tire 100 into and out of mold assembly 200, and that the extended position (i.e., actuated condition) is suitable for performing the subject manufacturing process of curing non-pneumatic tires. During actuation, which is represented by arrows AR2 in FIG. 9, curing shoes 246 and 248 are displaced in opposing directions such that the curing shoes generate fully or partially (e.g., acting at an obtuse included angle) counteracting forces (e.g., radially-inward pressure on layer 124 from curing shoe 246 and radially-outward pressure on layer 126 from curing shoe 248).

As mentioned above, curing shoes 246 and/or 248 (or any segments thereof) can include any suitable number of walls, wall portions, surfaces and/or surface portions. In some cases, the curing shoes (or any segments thereof) can have a common shape and/or configuration. In other cases, curing shoes 246 and 248 (or any segments of either or both thereof) can have different shapes and/or configurations, such as may complement a corresponding shape and/or configuration of curable features and/or elastomeric materials of less-than-fully-cured non-pneumatic tire 100. As a non-limiting example, curing shoes 246 and 248 (or any segments thereof) can include a shoe wall 254 that extends axially between an end 256 and an end 258. In cases in which the curing shoes are formed from two or more curing shoe segments, adjacent curing shoe segments can meet at a joint line 260 at or along which two adjacent curing shoe segments can abut one another or can be attached to one another, such as by a flowed-material joint (not numbered), for example.

In some cases, shoe walls 254 have an approximately U-shaped or V-shaped cross-sectional profile when viewed from an axial direction. For example, shoe wall 254 can include an edge wall portion 262 as well as side wall portions 264 and 266 that extend from along edge wall portion 262 toward shoe edges 268 and 270 that extend axially along the curing shoes. In some cases, edge wall portion 262 together with side wall portions 264 and 266 can at least partially form an outer surface portion 272 and an inner surface portion 274 of shoe walls 254. In such cases, outer surface portion 272 can have a profile or shape complementary or otherwise corresponding to end surface portion 158 of inner layer 124 and/or end surface portion 162 of outer layer 126 of structure body 108. In some cases, outer surface portion 272 can have a convex profile or shape along side wall portion 264 and a concave profile or shape along side wall portion 266. It will be appreciated, however, that other configurations and/or arrangements could alternately be used without departing from the subject matter of the present disclosure.

Additionally, or in the alternative, inner surface portion 274 can have a profile or shape complementary or otherwise corresponding to a surface or surface portion of lateral-pressure members 242 and/or 244, such as is discussed hereinafter. For example, inner surface portion 274 can have a first section with a cross-sectional profile or shape that is disposed at an acute included angle relative to shoe assembly axis SAX, as is represented in FIG. 10 by reference dimension AG1. Additionally, or in the alternative, inner surface portion 274 can have a second section with a cross-sectional profile or shape that is disposed at an acute included angle relative to shoe assembly axis SAX, as is represented in FIG. 10 by reference dimension AG2. In some cases, included angle AG1 can be disposed on or along one of the curing shoe segments (e.g., segments 246A and/or 248A) with included angle AG2 disposed on or along another one of the curing shoe segments (e.g., segments 246B and/or 248B). It will be appreciated, however, that other configurations and/or arrangements could alternately be used without departing from the subject matter of the present disclosure.

In some cases, the lateral-pressure members can have different shapes and/or configurations. In other cases, lateral-pressure members 242 and 244 can have a common shape and/or configuration or otherwise be substantially similar to one another. As such, it will be appreciated that the lateral-pressure members can include any suitable number of walls, wall portions, surfaces and/or surface portions. For example, lateral-pressure members 242 and/or 244 can extend from an end 276 toward and end 278 and can include a member wall 280 that at least partially defines a pressure member chamber 282 within the lateral-pressure members. Member wall 280 can include an end wall portion 284 disposed on or along end 276 and an end wall portion 286 disposed on or along end 278. End wall portions 284 and 286 are shown as being oriented generally transverse to shoe assembly axis SAX. End wall portion 284 includes openings or passages 288 extending therethrough in fluid communication with pressure member chamber 282. End wall portion 284 extends outwardly to an outer peripheral edge portion 290 with a surface portion 292 facing away from end 278 and a surface portion 294 facing toward end 278.

Member wall 280 also includes side wall portions 296 and 298 that extend axially between end wall portions 284 and 286 in spaced relation to one another such that pressure member chamber 282 is at least partially defined therebetween. Side wall portions 296 and 298 extend laterally between and/or otherwise at least partially define edge portions 300 and 302 of lateral-pressure members 242 and/or 244. A surface portion 304 of at least side wall portions 296 and 298 adjacent edge portion 300 has a profile disposed at an acute included angle relative to shoe assembly axis SAX, such as is represented in FIG. 10 by reference dimension AG3. Additionally, or in the alternative, a surface portion 306 of at least side wall portions 296 and 298 adjacent edge portion 302 has a profile disposed at an acute included angle relative to shoe assembly axis SAX, such as is represented in FIG. 10 by reference dimension AG4. In some cases, acute included angles AG1 and AG3 can be approximately equal to one another. Additionally, or in the alternative, acute include angles AG2 and AG4 can be approximately equal to one another.

As discussed above, curing shoe assemblies 236 can be actuated and/or de-actuated by way of any suitable combination of one or more force applicators. For example, mold assembly 200 and/or interstitial curing system 210 thereof can be communicatively coupled with pressurized fluid source PFS, for example. In such cases, pressurized fluid (e.g., air, steam, water, oil) from pressurized fluid source PFS can apply, balance and/or otherwise control the application of forces to curing shoe assemblies as the same are selectively displaced between extended and retracted positions, such as may respectively correspond to actuated and de-actuated conditions of the curing shoe assemblies. It will be appreciated that forces applied, balances and/or otherwise controlled by pressurized fluid source PFS can be selectively applied, balanced and/or otherwise transferred to and/or from curing shoe assemblies 236 in any suitable manner.

As one non-limiting example, mold assembly 200 can include on or more fluid-pressure transfer (or distribution) systems disposed in fluid communication with one or more of pressurized fluid sources PFS. In the arrangement shown and described herein, mold section 202 includes a fluid-pressure transfer (or distribution) system 308 operatively associated with curing system section 238. Additionally, or in the alternative, mold section 204 can include a fluid-pressure transfer (or distribution) system 310 operatively associated with curing system section 240. Fluid-pressure distribution systems 308 and 310 are shown as being substantially similar to one another, and as including a base plate 312 supported on or along mold sections 202 and 204 and through which passages 206 can extend in fluid communication with at least pressurized fluid source PFS. Fluid-pressure distribution systems 308 and/or 310 can also include an inner side wall 314 and an outer side wall 316 that are supported directly or indirectly on base plate 312 with the outer side wall spaced radially outward of the inner side wall. A support plate 318 is secured on or along inner and outer side walls 314 and 316 such that a fluid chamber 320 is at least partially defined therebetween. Fluid chamber 320 can be disposed in fluid communication with pressurized fluid source PFS in any suitable manner, such as by way of conduits 206, for example.

It will be appreciated that lateral-pressure members 242 and 244 can be supported on or along support plates 318 in any suitable manner. As one non-limiting example, support plates 318 can include a plurality of openings or passages 322 extending therethrough. Lateral-pressure members 242 and 244 extend through openings 322 such that end 276 is positioned within fluid chamber 320 and end 278 is dispose outward of the fluid chamber. Openings 322 are disposed in peripherally-spaced relation to one another about mold axis MAX. In a preferred arrangement, openings 266 can have a shape, configuration and/or arrangement complementary to the lateral-support members and/or to support structures 140 and/or spaces 154 of less-than-fully-cured non-pneumatic tire 100 (e.g., radially offset from axis AX and disposed at a common peripheral spacing), such as has been described above in connection with support plates 222 and 224, for example. In such an arrangement, an approximately uniform and/or otherwise balanced fluid pressure is applied to surface portions 292 of lateral-pressure members 242 and/or 244 that are disposed in fluid communication with a common one of fluid chambers 320 of fluid-pressure distribution systems 308 and/or 310.

During use and operation, curing shoes 246 and/or 248 are provided separately from lateral-pressure members 242 and/or 244, and are positioned within spaces 154 of less-than-fully-cured non-pneumatic tire 100. The non-pneumatic tire is positioned with mold assembly 200, and mold sections 202 and 204 are moved toward one another such that less-than-fully-cured non-pneumatic tire 100 is captured within mold cavity 214 and/or 218 in operative engagement with interstitial curing system 210. In such an arrangement, less-than-fully-cured non-pneumatic tire 100 and curing shoes 246 and/or 248 are disposed in approximate alignment with lateral-pressure members 242 and/or 244. A quantity of fluid 324 (e.g., air, steam, water, oil) is disposed within fluid chamber 320 and applies approximately uniform or otherwise balanced fluid pressure on or along surface portion 292 of lateral-pressure members 242 and/or 244, which permits lateral-pressure members 242 and 244 to be displaced toward one another with an approximately uniform and/or otherwise balanced force thereby generating corresponding approximately uniform and/or otherwise balanced compression of the less-than-fully-cured elastomeric materials of non-pneumatic tire 100.

As pressure is applied to less-than-fully-cured non-pneumatic tire 100 by curing shoe assemblies 236, a method in accordance with the subject matter of the present can also include applying heat to the less-than-fully-cured non-pneumatic tire. It will be appreciated that heat can be transferred into less-than-fully-cured non-pneumatic tire 100 in any suitable manner and/or through any suitable combination of heat transfer mechanisms and/or processes. As one example, mold assembly 200 can be communicatively coupled with heated fluid source HFS. In such case, heated fluid (e.g., air, steam, water) can be circulated into any suitable combination of passages and/or chambers of mold assembly 200 and/or non-pneumatic tire assembly 100. For example, mold assembly 200 and/or interstitial curing system 210 can include one or more heated-fluid transfer (or distribution) systems. In the arrangement shown and described herein, mold section 202 includes a heated-fluid transfer (or distribution) system 326 that is operatively associated with curing system section 238. Additionally, or in the alternative, mold section 204 can include a heated-fluid transfer (or distribution) system 328 operatively associated with curing system section 240. Heated-fluid distribution systems 326 and 328 are shown as being substantially similar to one another, and as including a manifold plate 330 that is directly or indirectly supported on or along mold sections 202 and/or 204. Heated-fluid distribution systems 326 and/or 328 can also include an end plate 332 supported on or along manifold plate 330 such that one or more of passages 208 are provided, such as may be disposed in fluid communication with heated fluid source HFS.

Passages 208 can be disposed in fluid communication with pressure member chambers 282 of lateral-pressure members 242 and/or 244 in any suitable manner. As one non-limiting example, pickup tubes 334 can be supported on or along manifold plate 330 and/or end plate 332 with a distal end 336 thereof disposed within pressure member chambers 282 of the plurality of lateral-pressure members. In this manner, a quantity of heated fluid 336 (e.g., air, steam, water, oil) can be transferred into and out of pressure member chambers 282 byway of pickup tubes 334 and/or conduits 208, for example. Heated fluid 336 transfers heat into and through member wall 280 of lateral-pressure members 242 and 244 as well as through shoe wall 254 of curing shoes 246 and/or 248 and into less-than-fully-cured elastomeric materials of non-pneumatic tire 100. In a preferred arrangement, pickup tubes 334 are sealingly engaged with end wall portions 284 of member walls 280 while permitting the pickup tubes to translate into, out of and/or otherwise along passages 288 during use and operation of curing shoe assemblies 236.

Figure 12:
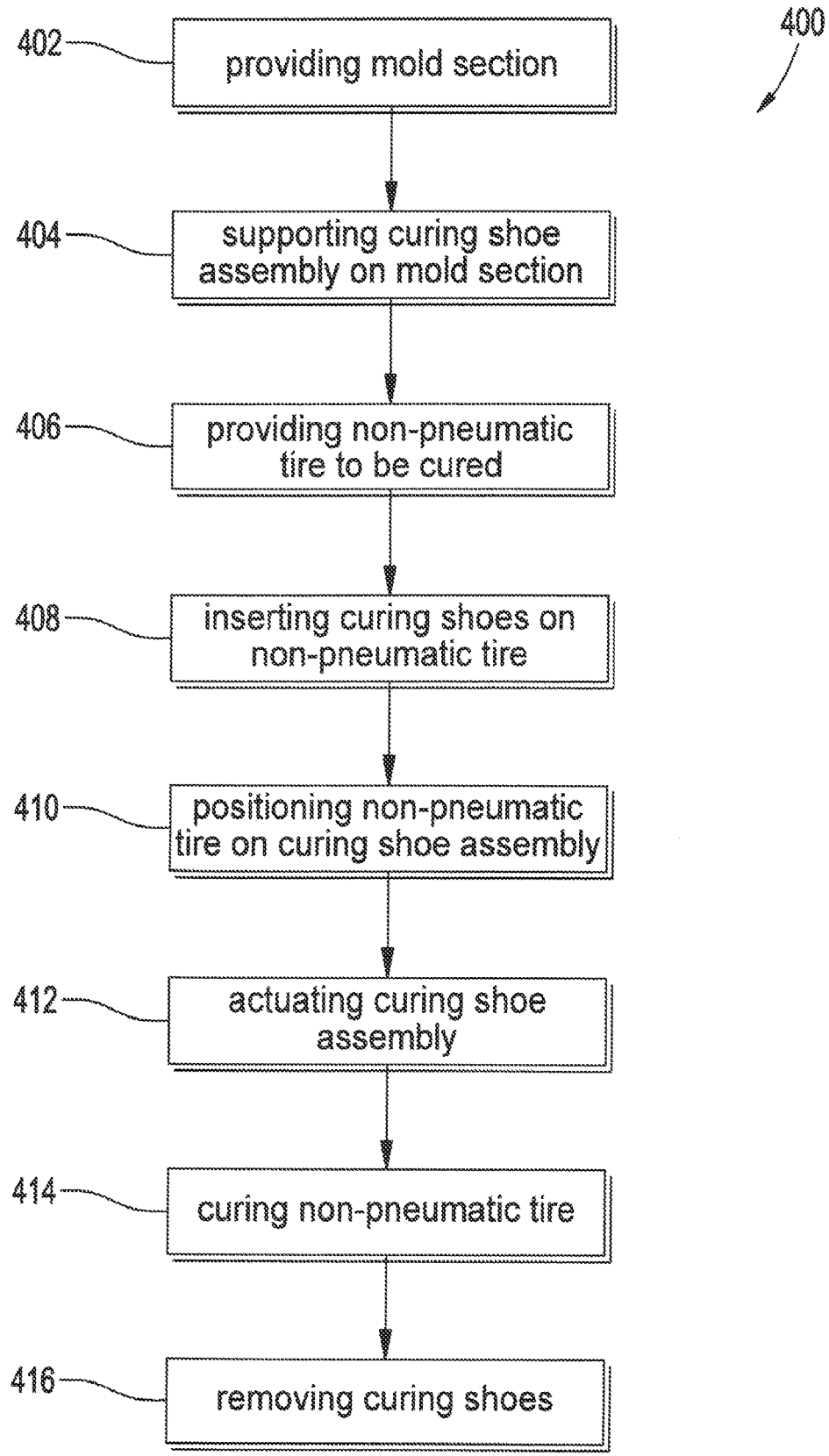
FIG. 12 is a graphical representation of one example of a method of manufacture in accordance with the subject matter of the present disclosure.

A method 400 of manufacturing in accordance with the subject matter of the present disclosure of manufacturing a non-pneumatic tire is shown in FIG. 12 can include providing a mold section having mold axis MAX, such as one of mold sections 202 and 204, for example, as is represented in FIG. 12 by reference number 402. Method 400 can also include supporting one or more curing shoe assemblies, such as curing shoe assemblies 236, for example, on the mold section in radially-offset relation to mold axis MAX, such as is represented in FIG. 12 by reference number 404. In a preferred arrangement, a plurality of curing shoe assemblies 236 will be disposed in spaced relation to one another about mold axis MAX to at least partially form interstitial curing system 210. Method 400 can further include providing less-than-fully-cured non-pneumatic tire 100 and positioning one or more curing shoes axially coextensively within the less-than-fully-cured non-pneumatic tire, as indicated by reference numbers 406 and 408, respectively. Method 400 can also include positioning less-than-fully-cured non-pneumatic tire 100 on or along the mold section in an axially coextensive arrangement with the one or more curing bladder assemblies, such as is represented in FIG. 12 by reference number 410. Method 400 can further include actuating the one or more curing shoe assemblies and then curing the non-pneumatic tire, such as is represented in FIG. 12 by reference numbers 412 and 414, respectively. Method 400 can also include removing the curing shoes from the cured non-pneumatic tire after removing non-pneumatic tire 100 from mold assembly 200, as is represented in FIG. 12 by reference number 416.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a non-pneumatic tire, said method comprising:
    supporting a first lateral-pressure member on a first mold section that has a longitudinally-extending mold axis with said first lateral-pressure member including a pressure member wall that includes a first edge surface portion and a second edge surface portion opposite said first edge surface portion;
    providing a less-than-fully-cured non-pneumatic tire that includes a plurality of support structures disposed in peripherally-spaced relation to one another and a plurality of spaces disposed in peripherally-spaced relation to one another with one of said plurality of spaces between adjacent ones of said plurality of support structures;
    inserting a first curing shoe into one of said plurality of spaces and a second curing shoe into said one of said plurality of spaces in laterally-spaced relation to said first curing shoe;
    positioning said less-than-fully-cured non-pneumatic tire along said first mold section such that said first lateral-pressure member is at least partially disposed within said one of said plurality of spaces with said first edge surface portion at least partially axially coextensive with said first curing shoe and with said second edge surface portion at least partially axially coextensive with said second curing shoe;
    displacing said first lateral-pressure member and said less-than-fully-cured non-pneumatic tire relative to one another such that said first edge surface portion operatively engages said first curing shoe and said second edge surface portion operatively engages said second curing shoe thereby urging said first and second curing shoes laterally away from one another into engagement with and applying pressure to said less-than-fully-cured non-pneumatic tire; and,
    curing said non-pneumatic tire.

2. A method according to claim 1, wherein each of said first and second curing shoes extend axially from a first shoe end to a second shoe end, and positioning said less-than-fully-cured non-pneumatic tire along said first mold section includes positioning said first lateral-pressure member toward said first end of said first and second curing shoes.

3. A method according to claim 1 further comprising supporting a second lateral-pressure member on a second mold section with said second lateral-pressure member including a first edge surface portion and a second edge surface portion opposite said first edge surface portion.

4. A method according to claim 3, wherein each of said first and second curing shoes extend axially from a first shoe end to a second shoe end, and said method further comprises positioning said second mold section such that said second lateral-pressure member is at least partially disposed within said one of said plurality of spaces with said first edge surface portion of said second lateral-pressure member at least partially axially coextensive with said second end of said first curing shoe and with said second edge surface portion of said second lateral-pressure member at least partially axially coextensive with said second end of said second curing shoe.

5. A method according to claim 4 further comprising displacing said second lateral-pressure member relative to said first lateral-pressure member and/or said less-than-fully-cured non-pneumatic tire such that said first edge surface portion of said second lateral-pressure member operatively engages said second end of said first curing shoe and said second edge surface portion of said second lateral-pressure member operatively engages said second end of said second curing shoe thereby urging said second ends of said first and second curing shoes laterally away from one another into engagement with and applying pressure to said less-than-fully-cured non-pneumatic tire.

6. A method according to claim 1, wherein supporting said first lateral-pressure member on said first mold section includes providing said first lateral-pressure member with a pressure-member axis disposed in radially-offset alignment with said mold axis and said first and second edge surface portions extending axially at an acute included angle relative to one another along at least a segment thereof.

7. A method according to claim 1 further comprising providing said first curing shoe with an first outer surface portion and said second curing shoe with a second outer surface portion, and inserting said first and second curing shoes into said one of said plurality of spaces includes abuttingly engaging said first and second outer surface portions with said less-than-fully-cured non-pneumatic tire such that said first and second curing shoes are self-retained on said less-than-fully-cured non-pneumatic tire prior to positioning said less-than-fully-cured non-pneumatic tire along said first mold section.

8. A method according to claim 1 further comprising retaining said first and second curing shoes in an axial position within said one of said plurality of spaces while displacing said first lateral-pressure member and said less-than-fully-cured non-pneumatic tire relative to one another and thereby urging said first and second curing shoes laterally away from one another into engagement with and applying pressure to said less-than-fully-cured non-pneumatic tire.

9. A method according to claim 1, wherein supporting said first lateral-pressure member on said first mold section includes said pressure member wall at least partially defining a pressure member chamber, and curing said less than fully-cured non-pneumatic tire includes introducing a heated fluid into said pressure member chamber.

10. A method according to claim 1, wherein:
    supporting said first lateral-pressure member on said first mold section includes supporting a plurality of first lateral-pressure members on said first mold section in peripherally-spaced relation to one another; and,
    inserting said first and second curing shoes into said one of said plurality of spaces includes inserting each one of a plurality of first curing shoes into a different one of said plurality of spaces and inserting each one of a plurality of second curing shoes into a different one of said plurality of spaces such that respective ones of said first and second curing shoes positioned within a common one of said plurality of spaces are disposed in laterally-spaced relation to one another therein.

11. A method according to claim 10, wherein positioning said less-than-fully-cured non-pneumatic tire along said first mold section includes positioning said less-than-fully-cured non-pneumatic tire along said first mold section such that each of said plurality of first lateral-pressure members is at least partially disposed within a different one of said plurality of spaces.

12. A method according to claim 1, wherein providing said less-than-fully-cured non-pneumatic tire includes:
providing a first annular ring having a longitudinal axis, said first annular ring extending axially between a first first ring end and a second first ring end spaced axially from said first first ring end, said first annular ring including a first ring outer surface portion facing radially outward and disposed between said first first ring end and said second first ring end; and,
applying a first layer of less-than-fully-cured elastomeric material along at least said first ring outer surface portion of said first annular ring.

13. A method according to claim 12, wherein providing said less-than-fully-cured non-pneumatic tire includes:
providing a second annular ring extending axially between a first second ring end and a second second ring end spaced axially from said first second ring end, said second annular ring including a second ring inner surface portion facing radially inward and disposed between said first second ring end and said second second ring end; and,
applying a second layer of less-than-fully-cured elastomeric material along at least said second ring inner surface portion of said second annular ring.

14. A method according to claim 13, wherein providing said less-than-fully-cured non-pneumatic tire includes positioning said second annular ring concentrically and coextensively with said first annular ring.

15. A method according to claim 14, wherein providing said less-than-fully-cured non-pneumatic tire includes providing a plurality of support structures with each of said plurality of support structures including a first support structure edge, a second support structure edge opposite said first support structure edge, a first support structure end and a second support structure end opposite said first support structure end.

16. A method according to claim 15, wherein providing said less-than-fully-cured non-pneumatic tire includes positioning said plurality of support structures in peripherally-spaced relation to one another about said longitudinal axis of said first annular ring such that said first support structure ends of said plurality of support structures are spaced apart from one another along said first layer of less-than-fully-cured elastomeric material and such that said second support structure ends of said plurality of support structures are spaced apart from one another along said second layer of less-than-fully-cured elastomeric material.

17. A mold assembly for curing non-pneumatic tires, said mold assembly comprising:
first and second mold sections having a mold axis extending longitudinally therebetween, said first and second mold sections axially displaceable relative to one another between a first axial position and a second axial position;
a first lateral-pressure member having a first pressure-member axis and supported on said first mold section such that said first pressure-member axis is disposed in radially-offset relation to said mold axis, said first lateral pressure member including a first pressure member wall with a first edge surface portion and a second edge surface portion opposite said first edge surface portion;
a second lateral-pressure member having a second pressure-member axis and supported on said second mold section such that said second pressure-member axis is disposed in radially-offset relation to said mold axis and in approximate coaxial alignment with said first pressure-member axis, said second lateral-pressure member including a second pressure member wall with a first edge surface portion and a second edge surface portion opposite said first edge surface portion;
a first curing shoe dimensioned to cooperatively engage said first lateral-pressure member and an associated less-than-fully-cured non-pneumatic tire; and,
a second curing shoe dimensioned to abuttingly engage said second lateral-pressure member and the associated less-than-fully-cured non-pneumatic tire.

18. A mold assembly according to claim 17, wherein said first pressure member wall at least partially defines a first fluid chamber and said second pressure member wall at least partially defines a second fluid chamber with said first and second fluid chambers disposed in fluid communication with an associated heated fluid source.

19. A mold assembly according to claim 17, wherein said first mold section includes a first pressurized fluid chamber and said first pressure member wall includes an end surface portion, said first lateral-pressure member operatively connected to said first mold section with said end surface portion disposed in said first pressurized fluid chamber such that pressurized fluid within said first pressurized fluid chamber acting on said end surface portion applies an axial force to said first lateral-pressure member.

20. A mold assembly according to claim 17, wherein said second mold section includes a second pressurized fluid chamber and said second pressure member wall includes an end surface portion, said second lateral-pressure member operatively connected to said second mold section with said end surface portion disposed in said second pressurized fluid chamber such that pressurized fluid within said second pressurized fluid chamber acting on said end surface portion applies an axial force to said second lateral-pressure member.

* * * * *